June 10, 1924.
E. SIEGEL
1,496,787
STEERING WHEEL LOCK FOR MOTOR VEHICLES
Filed Jan. 3, 1922
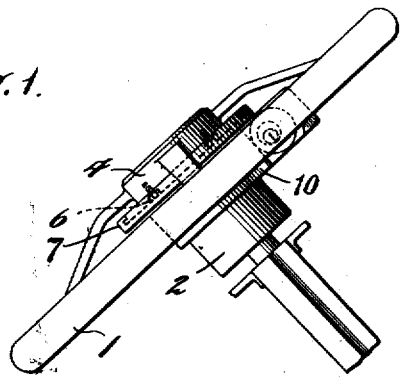
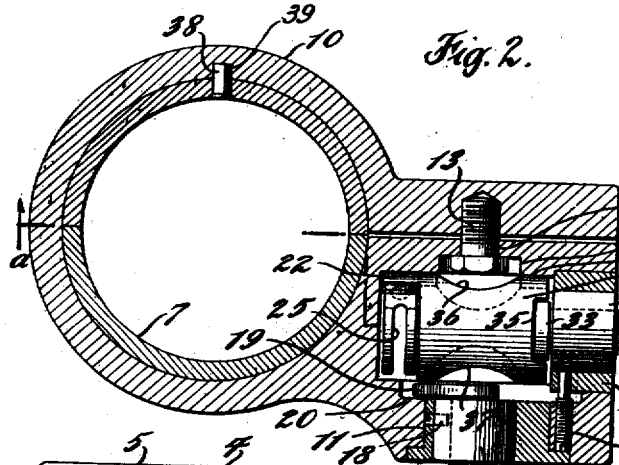
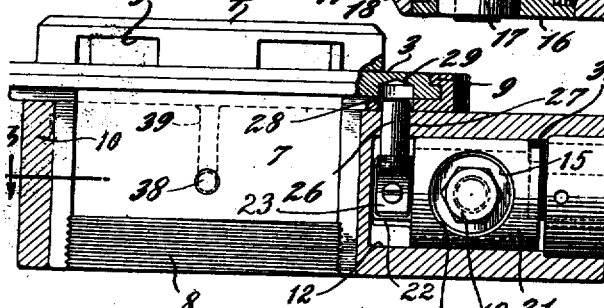
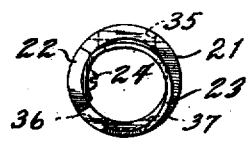
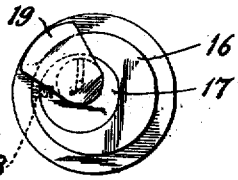
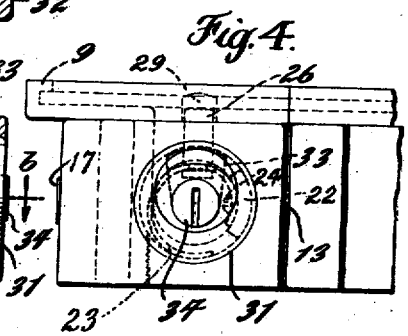
INVENTOR
Ernest Siegel
BY Stockbridge & Borst
ATTORNEYS Patented June 10, 1924.

1,496,787

UNITED STATES PATENT OFFICE.

ERNEST SIEGEL, OF NEW YORK, N. Y., ASSIGNOR TO AUTO KONTROL LOCK CORPORATION, A CORPORATION OF NEW YORK.

STEERING-WHEEL LOCK FOR MOTOR VEHICLES.

Application filed January 3, 1922. Serial No. 526,476.

*To all whom it may concern:*

Be it known that I, ERNEST SIEGEL, a citizen of the United States, residing at the city of New York, in the county of New York and State of New York, have invented certain new and useful Improvements in Steering-Wheel Locks for Motor Vehicles, of which the following is a full, clear, and exact description.
This invention relates to locking devices for motor vehicles for the purpose of preventing their theft or unauthorized use. More particularly, it relates to a locking device which is adapted to prevent relative movement between relatively moving parts of the steering mechanism so as to prevent operation or towing away of the vehicle for any considerable distance. Various locks of this type have heretofore been proposed, but have been unsatisfactory, principally because they have been susceptible of tampering or injury by a thief or unauthorized person within a short interval of time in such a manner as to be disabled sufficiently to enable the operation or towing away of the vehicle. A further objection to many prior locks has been that changes in the usual construction of the steering wheel or post have been necessary in order to apply the locking device, which greatly increased the cost of equipping the vehicle with the lock and also that the means of attachment of the various locks to the vehicles, or the vital parts of the locks, are exposed sufficiently to permit of tampering or removal of the lock in order to render it ineffective.

An object of the invention is to provide an improved locking device which may be set to prevent relative movement between two parts of the steering mechanism; which, when in a locked condition, will effectively conceal and protect the attaching means and the operating parts against tampering, injury or removal with ordinarily available tools; which is sufficiently strong and sturdy to be capable of withstanding severe blows or shocks without disablement or removal; which can be readily and easily attached to the common makes of motor vehicles without changes in their steering mechanism; and which is simple, inexpensive and durable in construction. Other objects and advantages will be apparent from the following description and the noval features of the invention will be particularly pointed out in claims.

The nature of the invention will appear from the following description of the preferred embodiment of the invention taken in connection with the accompanying drawings, in which:

Fig. 1 is an elevation of a portion of the steering mechanism of a motor vehicle to which this invention has been applied;

Fig. 2 is a section of the improved lock taken substantially along the line b—b of Fig. 3;

Fig. 3 is a section of the same taken substantially along the line a—a of Fig. 2;

Fig. 4 is an end elevation of the same;

Fig. 5 is an inside end elevation of the closure for one of the recesses; and

Fig. 6 is an end elevation of the cylindrical member and spring cam.

In the illustrated embodiment, the lock is applied between the steering wheel 1 and the relatively stationary gear box 2 that in certain makes of vehicles is provided upon the upper end of the steering column. The steering wheel is provided upon its under face with a flange-like extension 3 which may either be cast upon and form a part of the hub of the steering wheel or may comprise a clamp formed by a flanged or cup-shaped plate 4 having slots 5 in the flange thereof for the passage of the spokes of the wheel and a plate forming the actual flange-like extension which is secured thereto by screws 6 passing through and counter-sunk in the under face of the plate of the flange-like extension 3 and threaded into the abutting flange or rim of the plate 4. A longitudinally and axially split sleeve-like element 7 is provided at its lower end with internal screw threads 8 which are adapted to engage and embrace the screw threads that are commonly provided upon the upper end of the gear box 2 for the attachment of the cover of the box, the cover of the box being discarded when this device is attached thereto. The upper end of the split element 7 is provided with a peripheral flange 9 with an inturned peripheral edge which rotatively embraces and overlaps the flange-like extension 3 carried upon the under face of the steering wheel so that the steering wheel may be rotated relatively to the split element but will be held against removal therefrom in an axial direction.

A clamping ring 10 is split at one side so as to provide a spring clamp which fits over and embraces the hub of the split element 7. One of the arms of the spring clamp is provided with a pair of intersecting recesses 11 and 12. A screw 13 passes through an aperture 14 in the recessed arm of the clamp and is threaded into the other arm of the clamp so that rotation of the screw in the clamp will bring the two sections of the clamp together and securely clamp the sections of the split cylindrical element together and to the gear box 2 of the steering mechanism. The head of the screw is counter-sunk within a recess 15 in a wall of the recess 12 with sufficient clearance for a socket wrench that may be applied to the head of the screw. The recess 11, which is approximately in alignment with the screw, is provided with a closure 16 having considerable depth so that it can be removed only by a movement axially of the recess and not by a rocking movement therein upon one edge. A cylinder lock 17 of well known construction is eccentrically disposed within an aperture of the closure 16 and is held against removal therefrom by a screw 18 which passes through the peripheral wall of the closure at a point where it is concealed within the recess 11 when the closure is in place in the recess. A locking cam 19 is mounted upon the inner end of the cylinder of the lock 17 in a suitable manner so that it may be rotated by the cylinder to a position in which a portion thereof lies behind an undercut wall 20 of the recess 11 so as to normally prevent removal of the closure, but which may also be rotated to a position in which it will clear the wall 20 and permit of the removal of the closure from the recess. Within the recess 12, which extends at substantially right angles to the recess 11, there is disposed a sleeve-like cylindrical cage or member 21 which is provided at its inner end with an extension 22, extending therefrom in a direction parallel with the axis of the member. A spiral cam 23, preferably of resilient material such as spring steel, is secured at one end to the inner face of the extension 22 in a suitable manner, such as by a screw 24, the free end of the cam extending spirally outward with respect to the axis of the cylinder. The cam is provided with a slot 25 which extends from its free end to within a short distance of its point of attachment to the extension 22 of the cylinder. A locking member, which is conveniently in the form of a reciprocating locking bolt 26, is mounted for reciprocation in an aperture 27 in the clamping ring that extends from the recess 12 in a direction substantially parallel with the axis of the steering wheel and passes through an aligned aperture 28 in one of the sections of the split element. The locking bolt at a point adjacent its inner end is provided with a groove which receives the slotted end of the spiral cam 23. As the cylinder 21 is rotated the engagement of the cam within the groove of the locking bolt will operate the bolt in one direction or the other dependent upon the direction of rotation. A recess 29 is provided in the under face of the flange-like extension 3 so that as the extension revolves with the steering wheel the recess may be brought into alignment with the aperture 28 in the split element. When the cam is rotated to carry the inner end of the cam slot which is adjacent the point of attachment of the cam to the cylinder nearest to the locking bolt (see Figs. 3 and 4), the locking bolt will not project beyond the aperture 28 of the split element and the steering wheel is free to rotate. When the cylinder is rotated in a clockwise direction, (Fig. 4) the cam will operate the bolt outwardly and project the same into the recess 29 if the latter is in alignment with the aperture 28. If, however, the recess 29 is not in alignment with the aperture 28 when the cylinder is rotated to operate the locking bolt outwardly the cam will be flexed inwardly by the engagement of the bolt with the under face of the extension 3 and will yieldingly press the locking bolt against the under face of the flange-like extension so that if, during any subsequent rotation of the wheel and its extension, the recess 29 is brought into alignment with the aperture 28, the bolt will be automatically projected into the recess 29 due to the stress in the cam and prevent further rotation of the steering wheel.

A cylinder lock 30 of well known construction is mounted in a bushing 31 which is in turn mounted in the open end of the recess 12 to close the same. A set screw 32 is threaded through the wall of the ring surrounding the recess 12 and has an extension passing through an aperture in the bushing 31 and into the casing of the lock 30 to prevent rotation within the recess of the casing and bushing and withdrawal of the same from the open end of the recess. The head of the screw 32 is concealed by a flange of the closure 16 so that the screw is only accessible for removal when the closure is removed. A cam 33 is mounted upon the inner end of the rotatable cylinder 34 of the lock with a lost motion connection between them, so that as the cylinder 34 is rotated through a complete revolution, the cam 33 will be rotated through a half revolution. The cam 33 engages in a notch or slot 35 in the outer end of the cage 21, so that the said cage will be given a similar extent of movement. The lost motion connection between the cam 33 and the cylinder 34 by which the reduced ratio of movement is obtained is well known in the art and per se forms no part of this invention. With this type of lock, the cylinder will be automatically locked against rotation in its casing by the removal of the key and unlocked by its insertion into the cylinder. The rotation of the cylinder of the lock 30 by an appropriate key, therefore, causes an operation of the cage or cylinder 21 and its cam through the intermediary of the cam 33. The cylinder 21, which is preferably in the form of a sleeve and hollow, is provided with two diametrically disposed apertures 36 and 37 which are brought into alignment with the head of the screw 13 and the recess 11 when the cylinder is in unlocked position. These apertures are sufficiently large so that when the closure 16 is removed from the recess 11, a socket wrench may be inserted through the recess 11 and through the apertures 36 and 37 of the cylinder to engage and operate the head of the screw 13 and tighten or loosen the clamp.

In the application of the improved lock to a vehicle, the flanged plate 4 is placed over the hub of the wheel with the spokes passing through the notches 5 of the flange and the extension is secured against the lower face of the wheel and to the plate 4 by means of the screws 6, which pass through the extension and upwardly into the plate 4. The split clamp is passed downwardly over the gear box while the steering wheel is removed from the steering rod and is temporarily left in that position. After the steering wheel has been reapplied to the steering rod the sections of the split element 7 are caused to embrace the upper end of the gear box with the internal threads in engagement with the upper threaded end of the box and with the flange portion 9 embracing in rotative engagement the flange-like extension 3 of the steering wheel. The split ring clamp is then brought upwardly over the gear box and the hub of the split element until it abuts against the flange portion of the split element. Before the split ring clamp can be brought upwardly in this manner, a pin 38 upon the outer peripheral surface of the split element must first be brought into alignment with the longitudinally extending groove 39 in the inner wall of the split clamp in order that the apertures 27 and 28 will be in alignment when the parts are assembled. With the closure 16 removed, the bolt 13 may be inserted through recess 11 and through the apertures 36 and 37 of the cylinder 21 and a socket wrench also passed through the recess 11 and the apertures to engage the head of the screw and thread it into the other arm of the clamp to clamp the two free arms of the clamp together and press the sections of the split element firmly against the peripheral surface of the gear box. After the removal of the socket wrench the closure may be reapplied to the recess 11 and secured in closed position. The rotation of the cylinder 34 will operate the cylinder 21 and the cam 23 through a half revolution in either direction and thus yieldingly press the locking bolt into or out of locking engagement with the recess 29 in the flange-like extension of the steering wheel.

It will be observed that all of the means of attachment of the locking device to the parts of the steering mechanism are effectively concealed by other parts which are protected by locks, and it is, therefore, impossible to tamper with the device in such a manner as to disable it or render the same ineffective in restricting the steering movements. It is intended that the same key will operate the cylinders of both locks 17 and 30 in order to reduce the number of keys necessary to properly protect the locking device. While the cam 23 might be non-resilient and formed upon the inner end of the cylinder, it is preferably resilient so as to enable the device to be locked irrespective of the position of the steering wheel with respect to the gear box.

It will be obvious that various changes in the details and arrangement of the parts may be made by those skilled in the art within the principle and scope of the invention and that the device may be applied to the upper end of the steering column of motor vehicles which may or may not be provided with gear boxes.

I claim:

1. In a lock for vehicles having steering mechanism with a relatively stationary part, a steering rod, and a wheel carried by the rod, said lock comprising a flange-like extension on the lower face of said wheel, a split element adapted to embrace the stationary part and also rotatively embrace the extension and prevent separation of said wheel from the element, a clamp device adapted to embrace the split element and firmly secure it to said stationary part, and locking means carried by the clamp device for preventing loosening of the clamp device and operable to prevent rotation of the wheel and its extension relative to the split element.

2. In a lock for vehicles having steering mechanism with a relatively stationary part, a steering rod, and a wheel carried by the rod, said lock comprising a flange-like extension on the lower face of said wheel, a split element adapted to embrace the stationary part and also rotatively embrace the extension and prevent separation of said wheel from the element, a clamping ring embracing the split element and itself split at one point to form a spring clamp, a screw acting between the ends of the ring to tighten the ring and clamp it to the split element and clamp the latter to the stationary part, the end of the ring with which the head of the screw engages having therein a recess through which access is had to the screw to tighten or loosen it, and locking mechanism disposed in said recess and operable to prevent rotation of the wheel relatively to the split element.

3. In a lock for vehicles having steering mechanism with a relatively stationary part, a steering rod, and a wheel carried by the rod, said lock comprising a flange-like extension on the lower face of said wheel, a split element adapted to embrace the stationary part and also rotatively embrace the extension and prevent separation of said wheel from the element, a clamping ring embracing the split element and itself split at one point to form a spring clamp, a screw acting between the ends of the ring to tighten the ring and clamp it to the split element and clamp the latter to the stationary part, the end of the ring with which the head of the screw engages having therein a recess through which access is had to the screw to tighten or loosen it, a locking member carried by the ring and accessible for operation to lock the wheel and its extension against rotation relative to the split element from the interior of the recess, and a locking device disposed in the recess for operating the locking member and for controlling access to the head of the screw.

4. In a lock for vehicles having steering mechanism with a relatively stationary element and a wheel movable relatively thereto, a clamping ring embracing the stationary element and split at one point to form an integral spring clamp, a screw acting between the ends of the ring to tighten the ring upon the stationary element, a locking member disposed in said ring operable to a position to prevent rotation of the wheel, and locking mechanism mounted within that end of the ring with which the head of the screw engages for operating the locking member.

5. In a lock for vehicles having steering mechanism with a relatively stationary element and a wheel movable relatively thereto, a clamping ring embracing the stationary element and split at one point to permit adjustment of the clamp, a screw acting between the ends of the ring to tighten the ring upon the stationary element, the end of the ring with which the head of the screw engages having therein a recess and the head of the screw being accessible for operation from the recess, a cylinder rotatable in said recess and permitting access to the head of the screw when in one rotative position, a lock closing the recess and operable to rotate the cylinder to either of said positions, and means operated by the rotation of the cylinder for preventing rotation of the wheel.

6. In a lock for vehicles having steering mechanism with a relatively stationary element and a wheel movable relatively thereto, a clamping ring embracing the stationary element and split at one point to permit adjustment of the clamp, a screw acting between the ends of the ring for clamping the ring upon the stationary element, the end of the ring with which the head of the screw engages having therein a recess and the head of the screw being accessible for operation from the recess, a member rotatable in said recess and permitting access to the head of the screw when in one rotative position, a lock mounted in said recess and operable to rotate the member, means operated by the member for preventing rotation of the wheel when the member is in one position, said ring having a second recess communicating with the first recess and through which access is had to the screw head, means accessible through the second recess for securing the lock within the first recess, a closure for the second recess, and means for locking said closure to the ring to close the second recess.

7. In a lock for vehicles having two relatively-moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, a locking device for holding the closure in closed position, locking means carried by the recessed arm and operable to prevent relative movement of the parts, and locking mechanism disposed in the other of said recesses and controlling said locking means.

8. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, a locking device for holding the closure in closed position, means including a locking member carried by the recessed arm and operable to prevent relative movement of the parts, locking mechanism disposed in the other of said recesses and controlling said locking means, and means accessible through said one of the recesses when said recess is open for securing the locking mechanism within the other recess.

9. In a lock for vehicles having two relatively moving parts, a base member carried by one of the parts and having a recess therein, a locking member carried by the base member operative to and from a position in which it prevents relative movement of the parts and extending into said recess, a spring cam cooperating with said locking member to yieldingly stress it in either direction, and locking means disposed within and closing the recess and operating said spring cam to yieldingly project or retract the locking member.

10. In a lock for vehicles having two relatively moving parts, a base member carried by one of the parts and having a recess therein, a locking member carried by the base member operative to and from a position in which it prevents relative movement of the parts and extending into the recess, a member rotatively mounted in said recess and carrying an arcuate cam of resilient material that engages with and directly operates the locking member into and out of movement preventing position, and locking means disposed within and closing the recess and adapted to engage and operate said rotative member to cause it to in turn operate the cam.

11. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, a locking device for holding the closure in closed position, a locking member carried within the recessed arm and operable into and out of a position in which it prevents relative movement of the parts, a cylinder rotatably mounted in the other of said recesses and having therein an aperture adapted during rotation of the cylinder to be brought into alignment with the said one of the recesses and the head of the screw to permit the screw to be inserted or tightened, a cam carried by the cylinder and engaging with said locking member to operate the latter as the cylinder is rotated and a lock disposed within and closing the cylinder containing recess and adapted to engage and rotate the cylinder.

12. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, a locking device for holding the closure in closed position, a locking member carried within the recessed arm and operable into and out of a position in which it prevents relative movement of the parts, a cylinder rotatably mounted in the other of said recesses and having therein an aperture adapted during rotation of the cylinder to be brought into alignment with the said one of the recesses and the head of the screw to permit the screw to be inserted or tightened, a cam carried by the cylinder and engaging with said locking member to operate the latter as the cylinder is rotated, a lock disposed within and closing the cylinder containing recess and adapted to engage and rotate the cylinder, and means accessible through said one of the recesses when said recess is open for securing the lock within its recess.

13. In a lock for vehicles having steering mechanism with a relatively stationary part, a steering rod, and a wheel carried by the rod, said lock comprising a flange-like extension on the lower face of said wheel, a split element adapted to embrace the stationary part and also rotatively embrace the extension and prevent separation of said wheel from the element, a clamp embracing the split element and adjustable at one point to enlarge or restrict its opening, a screw acting at the adjustable point to tighten the clamp and secure the split element to the stationary part, the arm of the clamp with which the head of the screw engages having therein a recess through which access is had to the screw to tighten or loosen it, and locking mechanism disposed in said recess and operable to prevent rotation of the wheel relatively to the split element.

In witness whereof, I hereunto subscribe my signature.

ERNEST SIEGEL.